(12) United States Patent
Kafuku et al.

(10) Patent No.: US 9,534,690 B2
(45) Date of Patent: Jan. 3, 2017

(54) LEAKAGE PREVENTION SEAL, AND PUMP FOR NUCLEAR REACTOR COOLING MATERIAL

(71) Applicant: MITSUBISHI HEAVY INDUSTRIES, LTD., Tokyo (JP)

(72) Inventors: Hidetaka Kafuku, Tokyo (JP); Hidekazu Uehara, Tokyo (JP); Yukihiro Sakaguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/769,714

(22) PCT Filed: Dec. 24, 2013

(86) PCT No.: PCT/JP2013/084482
§ 371 (c)(1),
(2) Date: Aug. 21, 2015

(87) PCT Pub. No.: WO2014/147915
PCT Pub. Date: Sep. 25, 2014

(65) Prior Publication Data
US 2016/0010749 A1 Jan. 14, 2016

(30) Foreign Application Priority Data
Mar. 19, 2013 (JP) .................. 2013-056847

(51) Int. Cl.
*F16J 15/06* (2006.01)
*F04D 29/10* (2006.01)
(Continued)

(52) U.S. Cl.
CPC ............... *F16J 15/164* (2013.01); *F04D 7/08* (2013.01); *F04D 29/126* (2013.01); *F16J 15/008* (2013.01); *G21C 15/02* (2013.01)

(58) Field of Classification Search
CPC .......... F16J 15/16; F16J 15/164; F16J 15/008; F04D 7/08; F04D 29/12; F04D 29/126; F04D 29/128; F04D 29/16; F04D 29/165
See application file for complete search history.

(56) References Cited

U.S. PATENT DOCUMENTS

2007/0172367 A1 7/2007 Janocko
2010/0150715 A1* 6/2010 Howard ................ F16J 15/164
415/230
(Continued)

FOREIGN PATENT DOCUMENTS

CA 2551014 A1 7/2005
JP 63-22397 U 2/1988
(Continued)

OTHER PUBLICATIONS

International Search Report dated Mar. 4, 2014, issued in counterpart application No. PCT/JP2013/084482, with English translation. (4 pages).
(Continued)

*Primary Examiner* — Gilbert Lee
(74) *Attorney, Agent, or Firm* — Westerman, Hattori, Daniels & Adrian, LLP (57) ABSTRACT

This leakage prevention seal is provided with: a first seal ring which surrounds a rotating shaft and which is in circumferential contact with the surface of a housing which faces the upstream side; a second seal ring, which, on the upstream side of the first seal ring, surrounds the rotating shaft and which is in circumferential contact with the first seal ring; and a heat-driven section which, when high-temperature pressurized water reaches the heat-driven section, reduces the diameter of both the first seal ring and the second seal ring and causes the inner peripheral surfaces of both the first seal ring and the second seal ring to be in (Continued)

contact with the rotating shaft. The circumferential positions of both a first range between the first seal ring and the rotating shaft and a second range formed by the second seal ring are different.

10 Claims, 9 Drawing Sheets

(51) Int. Cl.
  *F16J 15/16* (2006.01)
  *F04D 7/08* (2006.01)
  *F16J 15/00* (2006.01)
  *F04D 29/12* (2006.01)
  *G21C 15/02* (2006.01)

(56) References Cited

U.S. PATENT DOCUMENTS

| | | | |
|---|---|---|---|
| 2014/0271288 A1* | 9/2014 | Hawkins | F04D 7/08 417/423.11 |
| 2015/0221400 A1* | 8/2015 | Saeki | F16J 15/3272 376/203 |

FOREIGN PATENT DOCUMENTS

| | | |
|---|---|---|
| JP | U4-62922 | 5/1992 |
| JP | 2000-027995 A | 1/2000 |
| JP | 2003-287143 A | 10/2003 |
| JP | 2009-85391 A | 4/2009 |
| JP | 2012-511680 A | 5/2012 |
| JP | 2012-145224 A | 8/2012 |
| WO | 2010/068615 A2 | 6/2010 |

OTHER PUBLICATIONS

Translation of Written Opinion dated Mar. 4, 2014, issued in counterpart application No. PCT/JP2013/084482, English translation. (6 pages).

Notice of Allowance dated Sep. 6, 2016, issued in counterpart Japanese Patent Application No. 2013-056847, with English translation. (6 pages).

Extended (Supplementary) European Search Report (EESR) dated Oct. 7, 2016, issued in counterpart European Patent Application No. 13878910.2. (9 pages).

* cited by examiner

LEAKAGE PREVENTION SEAL, AND PUMP FOR NUCLEAR REACTOR COOLING MATERIAL

TECHNICAL FIELD

The present invention relates to a leakage prevention seal that is capable of preventing the leakage of high-temperature pressurized water in the event of an abnormality and a pump for a nuclear reactor cooling material that is provided with the leakage prevention seal.

The disclosure of Japanese Patent Application No. 2013-056847 filed on Mar. 19, 2013 including the specification, drawings, and abstract is incorporated herein by reference in its entirety.

BACKGROUND ART

A pump for a primary nuclear reactor cooling material is provided with a rotating shaft that rotates about an axis which extends in a vertical direction and a housing that surrounds the rotating shaft. A plurality of stages of shaft seals, which are arranged apart from each other in the vertical direction, are provided in a space between the rotating shaft and the housing. The plurality of stages of shaft seals perform pressure reduction so that high-pressure pressurized water on a lower side has the atmospheric pressure on an upper side (for example, refer to PTL 1).

CITATION LIST

Patent Literature

[PTL 1] Japanese Unexamined Utility Model Registration Application Publication No. 63-22397

SUMMARY OF INVENTION

Technical Problem

Regarding the pump for a primary nuclear reactor cooling material, it is assumed that pressurized water which has a temperature of, for example, 70° C. during a normal operation rises in temperature to approximately 300° C. in the event of an abnormality such as station black out (SBO). In this case, the high-temperature and the high-pressure pressurized water thereinafter, referred to as high-temperature pressurized water) may penetrate the lowermost shaft seal among the plurality of shaft seals to reach the second-lowest shaft seal.

The second-lowest shaft leakage prevention seal can be designed to be capable of enduring the high-temperature pressurized water. In a case where a heat-resistant O-ring that is arranged around the shaft leakage prevention seal is impaired by the high-temperature pressurized water, however, the primary cooling material may leak outside.

Accordingly, a configuration that is capable of regulating the flow of the high-temperature pressurized water during an abnormality needs to be provided in the gaps between the rotating shaft and the housing between the respective leakage prevention seals so that the high-temperature pressurized water does not reach the second-lowest shaft leakage prevention seal during the station black out.

The present invention provides a leakage prevention seal that is capable of regulating the flow of high-temperature and high-pressure pressurized water in the event of an abnormality and a pump for a nuclear reactor cooling material that is provided with the leakage prevention seal.

Solution to Problem

According to a first aspect of the present invention, there is provided a leakage prevention seal including the leakage prevention seal sealing a space between a rotating shaft rotating about an axis and a housing surrounding the rotating shaft from a radial outer side so as to regulate a flow of high-temperature pressurized water in the space from the upstream side to the downstream side in an axial direction, the leakage prevention seal including a first seal ring which surrounds the rotating shaft and which is in circumferential contact with the surface of the housing which faces the upstream side, a second seal ring, which, on the upstream side of the first seal ring, surrounds the rotating shaft and which is in circumferential contact with the first seal ring, and a heat-driven section which, when high-temperature pressurized water reaches the heat-driven section, reduces the diameter of both the first seal ring and the second seal ring and causes the inner peripheral surfaces of both the first seal ring and the second seal ring to be in contact with the rotating shaft, in which the first seal ring has a closed loop shape to form a first gap extending over a first range in a circumferential direction between the rotating shaft and the first seal ring during the reduction in diameter, in which the second seal ring forms a second gap, which allows the high-temperature pressurized water to leak to the downstream side, over a second range in the circumferential direction during the reduction in diameter, and in which the circumferential positions of both the first range and the second range are different.

According to the leakage prevention seal, the first seal ring and the second seal ring are pressed toward the downstream side by the high-temperature pressurized water when the high-temperature pressurized water reaches the leakage prevention seal from the upstream side. As a result, the first seal ring is brought into close contact with the abutting surface of the housing. In addition, the reaching by the high-temperature pressurized water causes the heat-driven section to reduce the diameters of the first seal ring and the second seal ring, and the gap between the first and second seal rings and the rotating shaft is narrowed. Accordingly, a flow of the high-temperature pressurized water to the downstream side of the leakage prevention seal can be inhibited.

The gap between the seal ring and the rotating shaft can be removed when the single seal ring such as the first seal ring and the second seal ring can be brought into close contact with the outer peripheral surface of the rotating shaft over the entire circumference, and thus sealability can be ensured. In reality, however, it is difficult to achieve the inner diameter of the seal ring during the reduction in diameter corresponding to the outer diameter of the rotating shaft due to a thermal expansion difference, a manufacturing tolerance, or the like. Accordingly, a gap may appear between the seal ring and the rotating shaft and leakage may occur.

According to the aspect of the present invention, the first range and the second range, where the first gap appearing between the first seal ring and the rotating shaft and the second gap appearing between the second seal ring and the rotating shaft are respectively formed, have different circumferential positions. Accordingly, the first gap and the second gap becoming the leak paths for the high-temperature pressurized water are discontinuously formed. In other words, the gaps appearing between the seal rings and the rotating shaft are discontinuously formed by using the two seal rings, and thus a leakage prevention effect can be achieved.

According to a second aspect of the present invention, the leakage prevention seal may further include a first gap positioning unit determining the circumferential position of the first range where the first gap is formed by applying a force in a radial direction to the first seal ring.

Accordingly, the crescent-shaped first gap formed between the first seal ring and the rotating shaft can be positioned at a desired position. In other words, the circumferential part of the first seal ring that is in close contact with the rotating shaft and the circumferential part of the first seal ring that is separated from the rotating shaft can be intentionally formed insofar as a force can be applied in the radial direction to the first seal ring.

According to a third aspect of the present invention, the leakage prevention seal may further include a pressing unit pressing the second seal ring toward the first seal ring.

Accordingly, the first seal ring can be brought into closer contact with the abutting surface of the housing. In addition, the second seal ring and the first seal ring can be brought into close contact with each other in the axial direction.

In the leakage prevention seal, according to a fourth aspect of the present invention, the first seal ring may include a ring main body extending in the circumferential direction of the rotating shaft, and a pair of soft members disposed at both respective ends of the ring main body, formed of a material softer than the material of the ring main body, and brought into contact with each other during the reduction in diameter.

When the first seal ring is reduced in diameter, the soft members at both of the ends of the ring main body are brought into close contact with each other, and thus the first seal ring can have a closed loop shape.

In the leakage prevention seal, according to a fifth aspect of the present invention, the heat-driven section may reduce the diameter of the first seal ring at a first temperature and may reduce the diameter of the second seal ring at a second temperature, and the first temperature may be lower than the second temperature.

Accordingly, the second seal ring is reduced in diameter after the first seal ring is reduced in diameter in the event of reaching by the high-temperature pressurized water. Accordingly, leakage of the high-temperature pressurized water can be inhibited.

In the leakage prevention seal, according to a sixth aspect of the present invention, the second seal ring of the leakage prevention seal may have a closed loop shape when reduced in diameter, and the second gap may extend over the first range between the second seal ring and the rotating shaft.

Even in a case where the second gap extends as described above, the leakage of the high-temperature pressurized water can be inhibited because of the difference in formation range between the first gap and the second gap.

According to a seventh aspect of the present invention, the leakage prevention seal may further include a second gap positioning unit determining the circumferential position of the second range where the second gap is formed by applying a force in the radial direction to the second seal ring.

Even in this case, the formation range of the second gap can be positioned as is the case with the first seal ring.

In the leakage prevention seal, according to an eighth aspect of the present invention, the second seal ring may have a C shape for both circumferential ends to face each other in the circumferential direction during the reduction in diameter, and the second gap may be formed between both of the ends of the second seal ring.

Even in a case where the second gap is formed as described above, the leakage of the high-temperature pressurized water can be inhibited because of the difference in formation range between the first gap and the second gap.

According to a ninth aspect of the present invention, there is provided a pump for a nuclear reactor cooling material including a rotating shaft rotating about an axis, a housing surrounding the rotating shaft from a radial outer side, and the leakage prevention seal according to any one of the aspects sealing a space between the rotating shaft and the housing so as to regulate a flow of high-temperature pressurized water in the space from the upstream side to the downstream side in the axial direction.

In the pump for a nuclear reactor cooling material, according to a tenth aspect of the present invention, an annular groove recessed to the radial outer side and extending in a circumferential direction may be formed in an inner peripheral surface of the housing, the first seal ring and the second seal ring may be arranged to be accommodated in the annular groove, and the surface of the annular groove facing the upstream side may be an abutting surface.

Advantageous Effects of Invention

According to the leakage prevention seal and the pump for a nuclear reactor cooling material described above, the first gap and the second gap becoming the leak paths for the high-temperature pressurized water are discontinuously formed, and thus the flow of the high-temperature and high-pressure pressurized water can be regulated in the event of an abnormality.

DESCRIPTION OF EMBODIMENTS

Hereinafter, a first embodiment of the present invention will be described in detail with reference to FIGS. 1 to 6.

Figure 1:
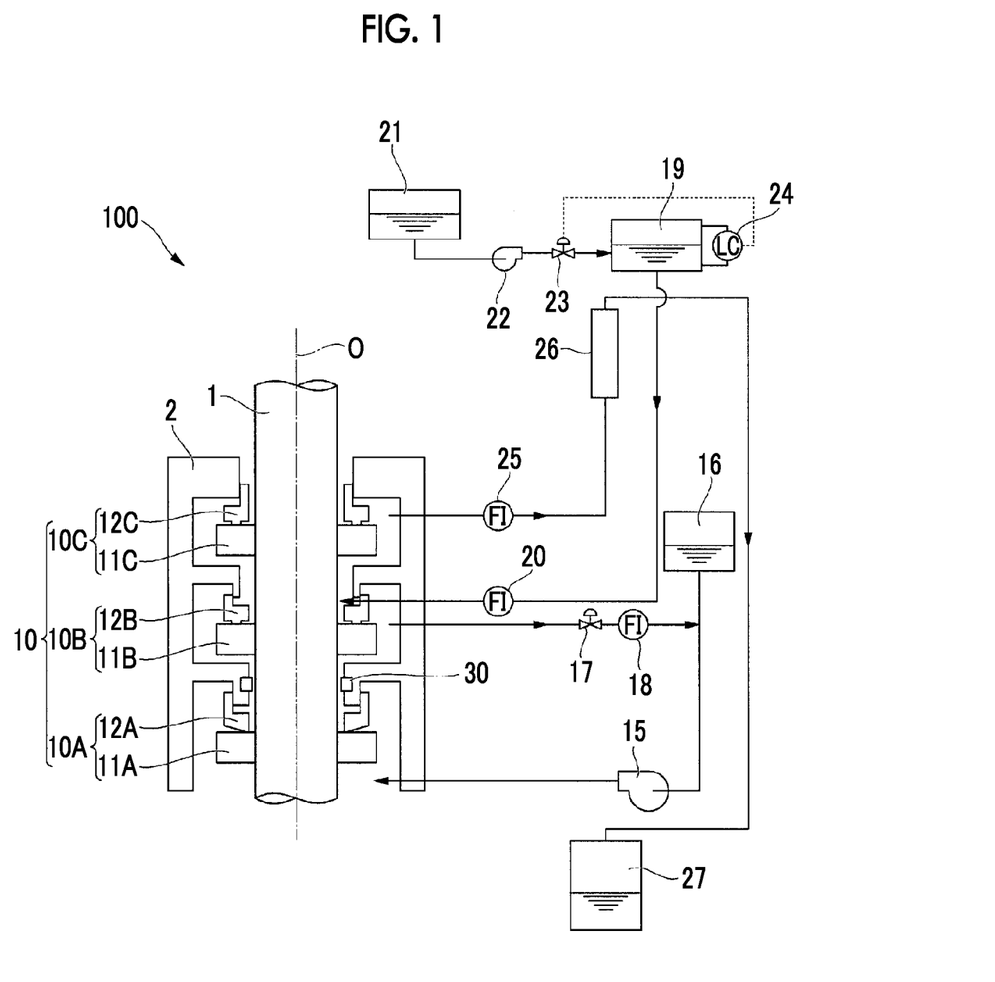
FIG. 1 is a diagram illustrating a longitudinal sectional view of a pump for a nuclear reactor cooling material according to a first embodiment of the present invention and a system diagram thereof.

Firstly, an overall configuration of a pump 100 for a nuclear reactor cooling material according to the first embodiment will be described. As illustrated in FIG. 1, the pump 100 for a nuclear reactor cooling material is provided with a rotating shaft 1 that is arranged to be capable of rotating about an axis O which extends in a vertical direction and a housing 2 that is arranged to surround the rotating shaft 1. A plurality of shaft seals 10, which are arranged apart from each other in the direction of the axis O, are disposed in a space between the rotating shaft 1 and the housing 2.

Three sets of the shaft seals 10, that is, a first shaft seal 10A, a second shaft seal 10B, and a third shaft seal 10C, are disposed from below in this embodiment. The first shaft seal 10A is a leakage-limiting seal and the second shaft seal 10B and the third shaft seal 10C are mechanical seals.

The first shaft seal 10A is provided with a first runner 11A and a first ring 12A. The first runner 11A is integrally fixed to an outer peripheral surface 1a of the rotating shaft 1, projects radially outside, and has a disk shape. The first ring 12A, which has a ring shape, is fixed to the housing 2 while forming a slight gap with the first runner 11A. A first secondary seal (not illustrated) is disposed between the first ring 12A and the housing 2.

The second shaft seal 10B is disposed above the first shaft seal 10A. The second shaft seal 10B is provided with a second runner 11B and a second ring 12B. The second runner 11B is integrally fixed to the outer peripheral surface 1a of the rotating shaft 1, projects radially outside, and has a disk shape. The second ring 12B, which has a ring shape, is fixed to the housing 2 and is in sliding contact with the second runner 11B. A second secondary seal (not illustrated) is disposed between the second ring 12B and the housing 2.

The third shaft seal 10C is disposed above the second shaft seal 10B. The third shaft seal 10C is provided with a third runner 11C and a third ring 12C. The third runner 11C is integrally fixed to the outer peripheral surface 1a of the rotating shaft 1, projects radially outside, and has a disk shape. The third ring 12C, which has a ring shape, is fixed to the housing 2 and forms a gap with the third runner 11C in sliding contact with the third runner 11C. A third secondary seal (not illustrated) is disposed between the third ring 12C and the housing 2.

A primary nuclear reactor cooling material is high-temperature water having a temperature of 200° C. to 300° C. High-pressure pressurized water (seal water) is supplied, by a filling material pump 15, to a lower portion of the first shaft seal 10A so that the high-temperature water does not rise in the housing 2. The pressurized water is supplied by a volume control tank 16.

The pressurized water leaking from the first shaft seal 10A and reaching a lower section of the second shaft seal. 10B returns to the volume control tank 16 through a shielding valve 17 and a flow meter 18.

Pure water, which is referred to as purge water, is supplied to a space below the third shaft seal 10C, that is, a space between the third shaft seal 10C and the second shaft seal 10B. The purge water is supplied through a throttle (not illustrated) and a flow meter 20 from a purge water head tank 19 that is disposed at a high place.

The pure water that is prepared in a pure water make-up tank 21 is supplied to the purge water head tank 19 through a pure water pump 22 and a supplementary feed valve 23. The supplementary feed valve 23 is controlled by a level control device 24 that detects the water head height of the pure water in the purge water head tank 19. The water head height of the purge water head tank 19 is maintained at a predetermined value by the level control device 24.

In addition, the purge water is used to lubricate and cool the second shaft seal 10B and the third shaft seal 10C and is recovered to a drain tank 27 through a flow meter 25 and a stand pipe 26.

The pressurized water below the first shaft seal 10A is 70° C. in temperature and is approximately 15.5 MPa in pressure. The pressure of the pressurized water is reduced to approximately 0.3 MPa in the first shaft seal 10A. In other words, the pressure of the pressurized water in the space below the second shaft seal 10B is approximately 0.3 MPa. In the second shaft seal 10B, this pressure of approximately 0.3 MPa is reduced to approximately 0.03 MPa. In addition, the pressure of the pressurized water is reduced to the atmospheric pressure in the third shaft seal. 10C.

It is assumed that the pressurized water below the first shaft seal 10A, which has a temperature of 70° C. during a normal operation, is heated by the primary nuclear reactor cooling material and the temperature rises to approximately 300° C. in the event of station black out. In a case where the first shaft seal 10A is penetrated by the pressurized water that has such a high temperature (hereinafter, referred to as high-temperature pressurized water), the high-temperature pressurized water may reach the second shaft seal 10B and the high-temperature pressurized water may leak out. In this embodiment, however, a leakage prevention seal 30 is disposed so that the high-temperature pressurized water that has a temperature of, for example, 300° C. and a pressure of, for example, approximately 19 MPa does not reach the second shaft seal 10B.

Figure 2:
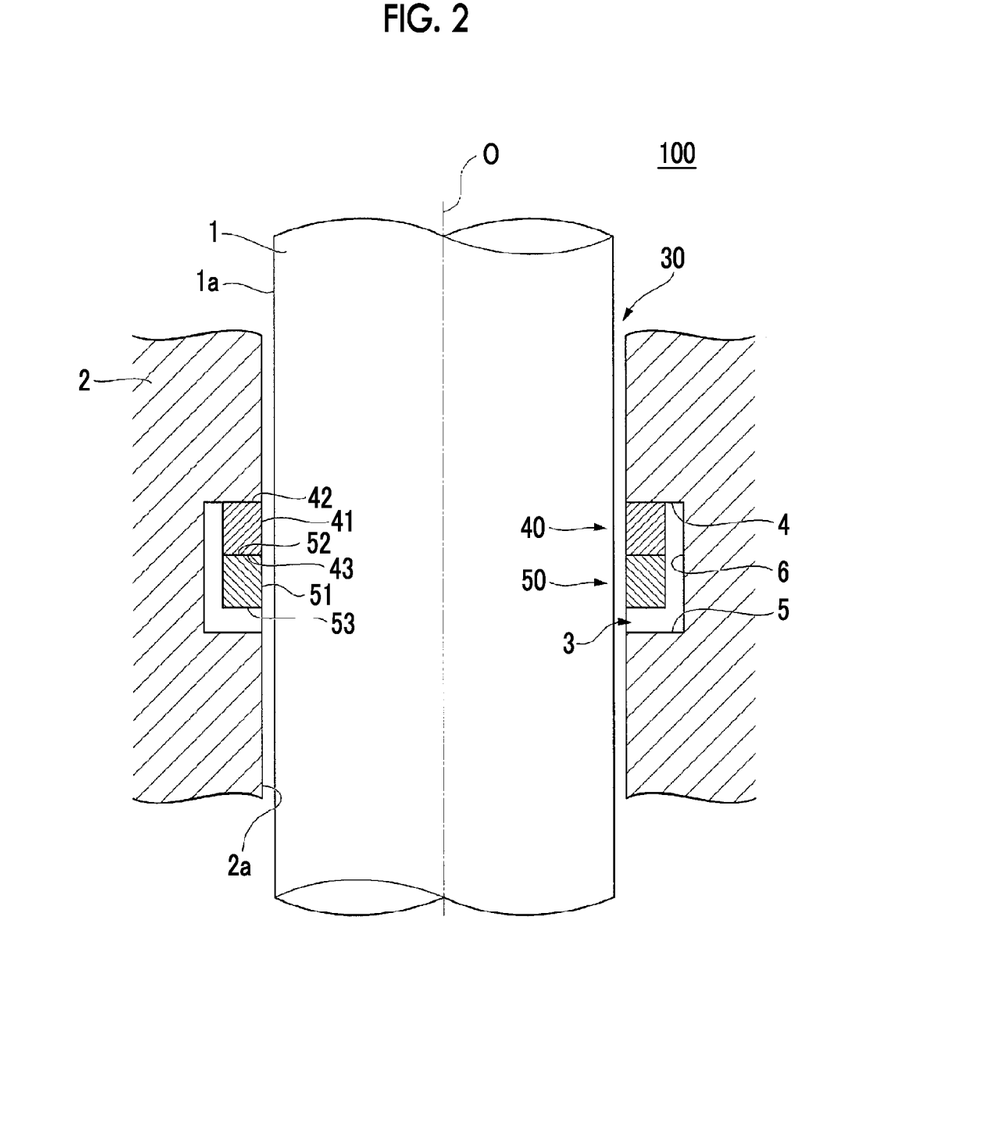
FIG. 2 is a longitudinal sectional view of a leakage prevention seal of the pump for a nuclear reactor cooling material according to the first embodiment of the present invention.

The leakage prevention seal 30 is disposed in a space between the housing 2 and the rotating shaft 1 and between the first shaft seal 10A and the second shaft seal 10B. In this embodiment, the leakage prevention seal 30 is disposed to be accommodated in an annular groove 3 that is disposed in the housing 2 as illustrated in FIG. 2.

The annular groove 3 is formed to be recessed from an inner peripheral surface 2a of the housing 2 to an outer side in the radial direction of the rotating shaft 1 (hereinafter, simply referred to as the radial direction). The annular groove 3, which has an annular shape, extends in the entire circumferential direction of the rotating shaft 1 (hereinafter, simply referred to as the circumferential direction) about the axis O. The annular groove 3 has an upper-side inner wall surface 4 (abutting surface) that is directed downward (first direction side in the direction of the axis O), a lower-side inner wall surface 5 that is directed upward (second direction side in the direction of the axis O) while facing the upper-side inner wall surface 4, and a bottom wall surface 6 that is directed to a radial inner side and is connected to the upper-side inner wall surface 4 and the lower-side inner wall surface 5. The upper-side inner wall surface 4 and the lower-side inner wall surface 5 have a flat shape and extend along a plane orthogonal to the axis O.

Figure 3:
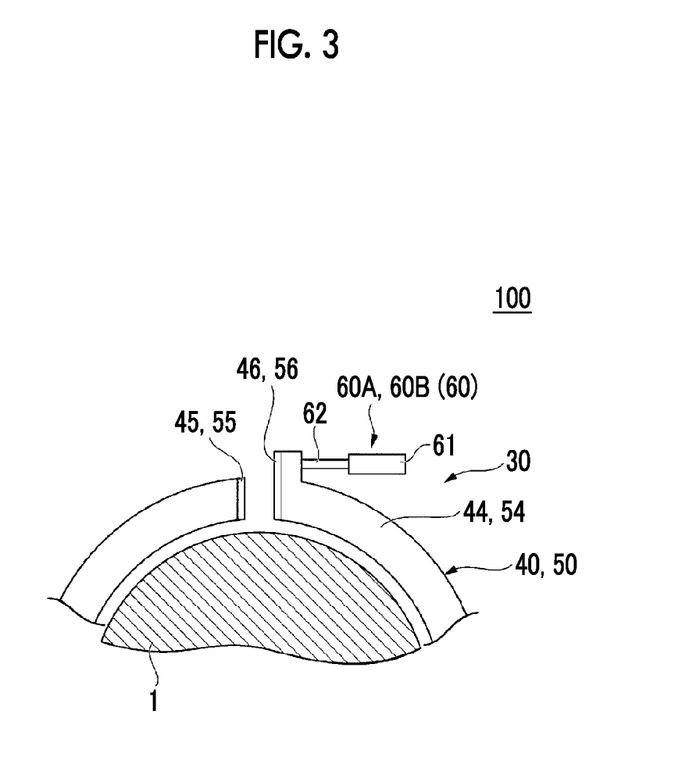
FIG. 3 is a diagram in which the leakage prevention seal of the pump for a nuclear reactor cooling material according to the first embodiment of the present invention is seen in an axial direction of a rotating shaft.

Hereinafter, the leakage prevention seal 30 will be described. As illustrated in FIGS. 2 and 3, the leakage prevention seal 30 according to this embodiment is provided with a first seal ring 40, a second seal ring 50 that is arranged to abut against the first seal ring 40 from below, and a heat-driven section 60 (not illustrated in FIG. 2) that reduces the diameters of the first seal ring 40 and the second seal ring 50.

As illustrated in FIG. 3, the first seal ring 40 and the second seal ring 50 are provided respectively with ring main bodies 44 and 54 and soft members 45 and 55. The ring main bodies 44 and 54 extend in the circumferential direction of the rotating shaft 1 so as to surround the rotating shaft 1. The soft members 45 and 55 are disposed at both ends of the respective ring main bodies 44 and 54 and are formed of a material softer than the material of the ring main bodies 44 and 54.

Each of the ring main bodies 44 and 54 has a pair of end portions independent of each other at both ends in an extension direction (circumferential direction), and the end portions have C shapes facing each other. In other words, the first seal ring 40 and the second seal ring 50 have a first end portion and a second end portion, which are not connected to each other, instead of having an annular shape integrally extending over the entire circumference thereof.

The soft members 45 and 55 are integrally disposed at both of the ends of the respective ring main bodies 44 and 54 to face each other in the circumferential direction. This pair of soft members 45 and 55 abut against each other when the diameter of the first seal ring 40 is reduced.

The soft members 45 and 55 may not be disposed in the second seal ring 50.

Examples of the material of the soft members 45 and 55 can include gold and silver among metals and ethylene propylene diene monomer (EPDM) and polyether ether ketone (PEEK) among polymer materials.

The soft members 45 and 55 may also be disposed on inner peripheral surfaces of the ring main bodies 44 and 54, that is, an inner peripheral surface 41 of the first seal ring 40 and an inner peripheral surface 51 of the second seal ring 50. In this case, adhesiveness can be improved between the rotating shaft 1 and the first and second seal rings 40 and 50 when the diameters of the first seal ring 40 and the second seal ring 50 are reduced.

In this embodiment, protruding portions 46 and 56 that protrude radially outside are integrally formed in the first end portion (end portion on the right side in FIG. 3) of the pair of end portions in the first seal ring 40 and the second seal ring 50 as illustrated in FIG. 3. In this embodiment, the respective end portions of the first seal ring 40 and the second seal ring 50 are moved closer to each other when the heat-driven section 60 presses the protruding portions 46 and 56 toward the second end portion (end portion on the left side in FIG. 3) side. As a result, the first seal ring 40 and the second seal ring 50 are reduced in diameter.

As illustrated in FIG. 2, an upper surface of the first seal ring 40 that has the configuration described above abuts, in the circumferential direction, against the upper-side inner wall surface 4 of the annular groove 3 of the housing 2.

In addition, the second seal ring 50 is arranged on a lower side of the first seal ring 40 to be adjacent to the first seal ring 40. An upper surface 52 of the second seal ring 50 abuts against a lower surface 43 of the first seal ring 40 in the circumferential direction.

In a state where the first seal ring 40 and the second seal ring 50 are arranged as described above, a space is formed between the bottom wall surface 6 of the annular groove 3 and the first and second seal rings 40 and 50. In addition, a space is formed between a lower surface 53 of the second seal ring 50 and the lower-side inner wall surface 5. Each of these spaces communicates with the space between the rotating shaft 1 and the housing 2 below the leakage prevention seal 30. Accordingly, the high-temperature pressurized water reaches these spaces in the event of an abnormality.

Each of an upper surface 42 and the lower surface 43 of the first seal ring 40 and the upper surface 52 and the lower surface 53 of the second seal ring 50 has a flat shape while extending along a plane orthogonal to the axis O.

Usually, that is, in a state where the high-temperature pressurized water does not reach the leakage prevention seal 30 (hereinafter, referred to as an initial state), each of the first seal ring 40 and the inner peripheral surface 51 of the second seal ring 50 is separated from the outer peripheral surface 1a of the rotating shaft 1 as illustrated in FIG. 2. Accordingly, gaps are formed between the rotating shaft 1 and the first and second seal rings 40 and 50 in the initial state.

In this embodiment, the circumferential arrangement positions of the pair of end portions of the first seal ring 40 differ from the circumferential arrangement positions of the pair of end portions of the second seal ring 50. In this embodiment, the circumferential arrangement positions of the pair of end portions of the first seal ring 40 are approximately 180° C. different from the circumferential arrangement positions of the pair of end portions of the second seal ring 50.

The circumferential length of the inner peripheral surface 41 of the first seal ring 40 is set to exceed the circumferential length of the outer peripheral surface 1a of the rotating shaft 1. In addition, the circumferential length of the inner peripheral surface 51 of the second seal ring 50 is set to be exceeded by the circumferential length of the outer peripheral surface 1a of the rotating shaft 1.

The heat-driven section 60 will be described below. In the event of an abnormality and reaching by the high-temperature pressurized water, the heat-driven section 60 reduces the diameters of the first seal ring 40 and the second seal ring 50 and allows the first seal ring 40 and the inner peripheral surface 51 of the second seal ring 50 to abut against the rotating shaft 1. In this embodiment, a first thermo actuator 60A and a second thermo actuator 60B are employed as the heat-driven section 60 as illustrated in FIG. 3. The first thermo actuator 60A and the second thermo actuator 60B are actuators that are configured to be drivable by using the high-temperature pressurized water as a heat source. The first thermo actuator 60A is disposed to correlate with the first seal ring 40 and the second thermo actuator 60B is disposed to correlate with the second seal ring 50. In FIG. 3, the two thermo actuators are collectively illustrated.

The first thermo actuator 60A and the second thermo actuator 60B are provided with a cylinder 61 and a rod 62.

The cylinder 61 is a member that has a cylindrical outer shape. The cylinder 61 is sealed with wax therein and the wax expands when reaching a set temperature. The cylinder 61 is accommodated in an accommodating portion (not illustrated) that is formed in the housing 2 to extend along a tangent through the arrangement locations of the pair of end portions on the circumferences of the first seal ring 40 and the second seal ring 50.

The rod 62 is configured to protrude from an extension-direction end surface of the cylinder 61 in response to the expansion of the wax in the cylinder 61. The direction in which the rod 62 protrudes is a direction along the tangent through the arrangement locations of the pair of end portions on the circumferences of the first seal ring 40 and the second seal ring 50. A tip of the rod 62 is connected to the protruding portions 46 and 56 of the first seal ring 40 and the second seal ring 50. The protruding portions 46 and 56 are pressed when the rod 62 protrudes. As a result, the first seal ring 40 and the second seal ring 50 are deformed and reduced in diameter so that the pair of end portions are moved closer to each other.

The expansion temperature of the wax in the first thermo actuator 60A is set to be lower than the expansion temperature of the wax in the second thermo actuator 60B. Accordingly, the drive temperature of the first thermo actuator 60A is lower than the drive temperature of the second thermo actuator 60B. In other words, the first seal ring 40 is reduced in diameter before the second seal ring 50 is reduced in diameter in the event of reaching by the high-temperature pressurized water.

Effects of the leakage prevention seal. 30 of the pump 100 for a nuclear reactor cooling material that has the configuration described above will be described below.

Figure 4:
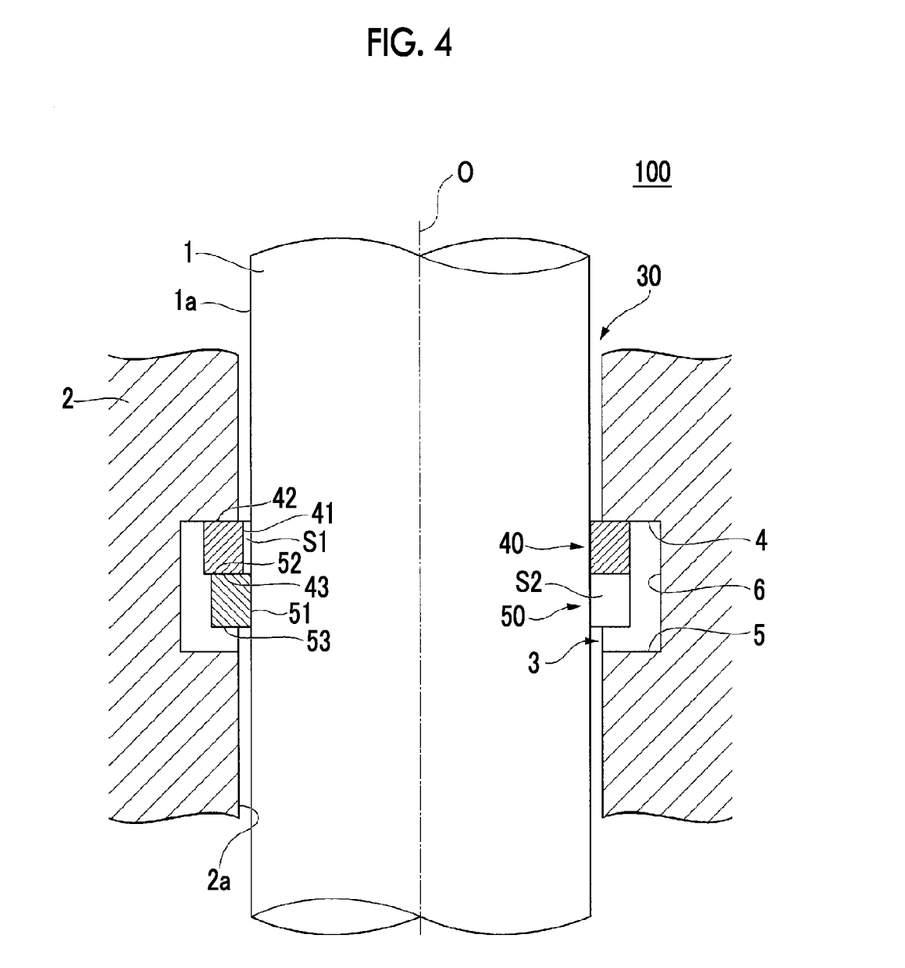
FIG. 4 is a longitudinal sectional view of the leakage prevention seal of the pump for a nuclear reactor cooling material according to the first embodiment of the present invention that is reduced in diameter.

When the pressurized water below the first shaft seal 10A is heated to become the high-temperature pressurized water and the high-temperature pressurized water penetrates the first shaft seal 10A to reach the leakage prevention seal 30, the first seal ring 40 and the second seal ring 50 are pressed upward, that is, to the downstream side, due to the fluid pressure of the high-temperature pressurized water. As a result, the upper surface 42 of the first seal ring 40 is brought into close contact, in the circumferential direction, with the upper-side inner wall surface 4 in the groove portion of the housing 2 as illustrated in FIG. 4 while the upper surface 52 of the second seal ring 50 is brought into close contact, in the circumferential direction, with the lower surface 43 of the first seal ring 40.

When the high-temperature pressurized water reaches the leakage prevention seal. 30 from below, the heat-driven section 60 of the leakage prevention seal 30 is heated by the high-temperature pressurized water.

Then, each of the wax in the first thermo actuator 60A and in the second thermo actuator 60B reaches the expansion temperature by using the high-temperature pressurized water as a heat source, and the expansion of the wax occurs. This causes the rod 62 of the first thermo actuator 60A and the second thermo actuator 60B illustrated in FIG. 3 to protrude from the cylinder 61.

When the protruding portions 46 and 56 of the first seal ring 40 and the second seal ring 50 are pressed because of the protrusion of the rod 62, the first seal ring 40 and the second seal ring 50 are reduced in diameter in entirety while the respective pairs of end portions are moved closer to each other.

It is preferable that the circumferential length of each of the inner peripheral surface 41 of the first seal ring 40 and the inner peripheral surface 51 of the second seal ring 50 during the reduction in diameter corresponds to the circumferential length of the outer peripheral surface 1a of the rotating shaft 1 so that the first seal ring 40 and the second seal ring 50 are in close contact with the rotating shaft 1 in the entire circumferential direction during the reduction in diameter. In this case, the gap between the rotating shaft 1 and the first and second seal rings 40 and 50 can be removed when the first seal ring 40 and the second seal ring 50 are in close contact with the outer peripheral surface 1a of the rotating shaft 1 over the entire circumference during the reduction in diameter. In reality, however, it is difficult to achieve inner diameters of the first seal ring 40 and the second seal ring 50 during the reduction in diameter corresponding to the outer diameter of the rotating shaft 1 due to a thermal expansion difference, a manufacturing tolerance, or the like.

In a case where the circumferential length of the inner peripheral surface 41 of the first seal ring 40 exceeds the circumferential length of the rotating shaft 1 as in this embodiment, both of the ends of the first seal ring 40 are brought into contact with each other when the first seal ring 40 is reduced in diameter. As a result, the first seal ring 40 has a closed loop shape. In this case, the inner peripheral surface 41 of the first seal ring 40 is in contact with the outer peripheral surface 1a of the rotating shaft 1 only in a partial range in the circumferential direction, and a part not in contact with the rotating shaft 1 may be present.

Figure 5A:
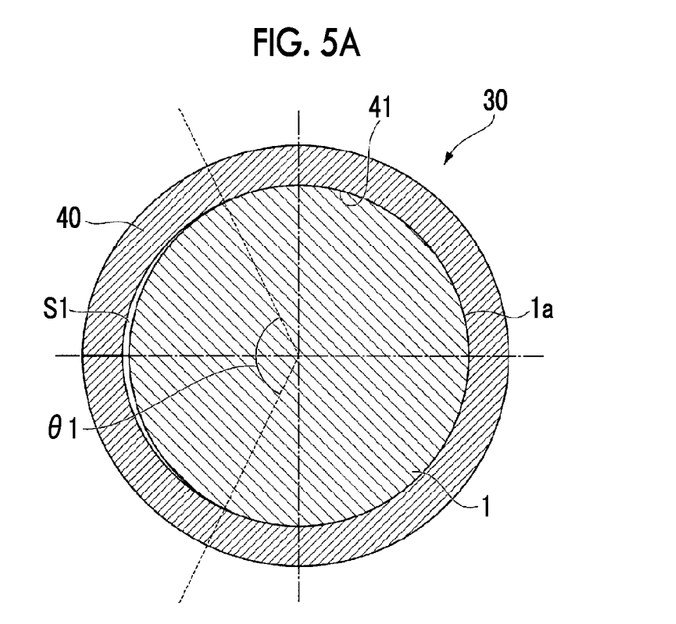
FIG. 5A is a schematic diagram in which a first seal of the leakage prevention seal of the pump for a nuclear reactor cooling material according to the first embodiment of the present invention that is reduced in diameter is seen in an axial direction.

In other words, a crescent-shaped gap (hereinafter, referred to as a first gap S1) that extends in the circumferential direction is formed, as illustrated in FIG. 5A, in a partial region (hereinafter, referred to as a first range $\theta 1$) in the circumferential direction between the inner peripheral surface 41 of the first seal ring 40 and the outer peripheral surface 1a of the rotating shaft 1. The first range $\theta 1$ in the circumferential direction in which the first gap S1 is present widens within a predetermined range in the circumferential direction about the location where the end portions of the first seal ring 40 are in contact with each other.

In a case where the circumferential length of the inner peripheral surface 51 of the second seal ring 50 is exceeded by the circumferential length of the rotating shaft 1 as in this embodiment, both of the ends of the second seal ring 50 maintain a C shape and are not brought into contact with each other even when the second seal ring 50 is reduced in diameter. In this case, the inner peripheral surface 51 of the second seal ring 50 is in contact with the outer peripheral surface 1a of the rotating shaft 1 in the entire circumferential direction thereof. A gap (hereinafter, referred to as a second gap S2) is formed between the end portions of the second seal ring 50 facing each other.

Figure 5B:
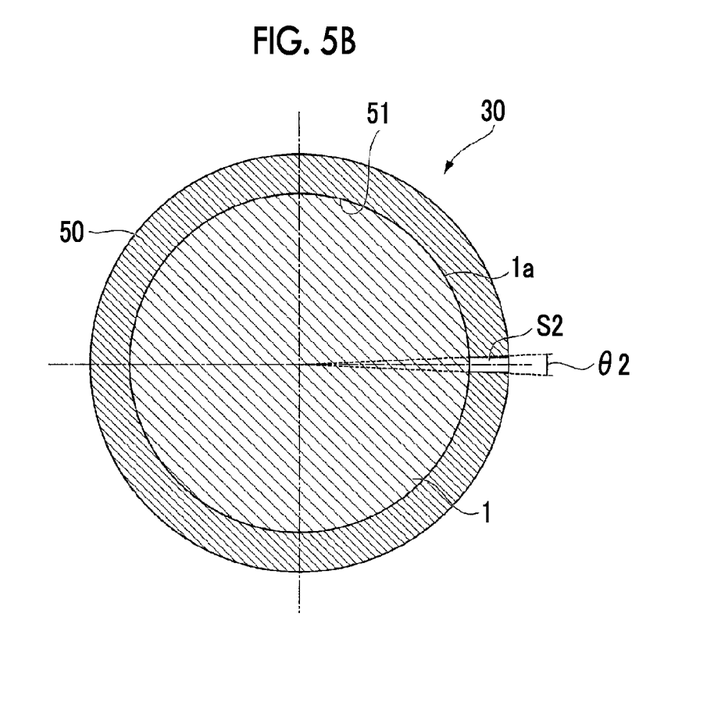
FIG. 5B is a schematic diagram in which a second seal of the leakage prevention seal of the pump for a nuclear reactor cooling material according to the first embodiment of the present invention that is reduced in diameter is seen in an axial direction.

In other words, the second gap S2, which is a gap between the end portions, is formed in a partial region (hereinafter, referred to as a second range $\theta 2$) in the circumferential direction as illustrated in FIG. 5B. The second gap S2 is formed in the vicinity of the circumferential position where the end portions of the second seal ring 50 are present before the second seal ring 50 is pressed by the second thermo actuator 60B.

Figure 6:
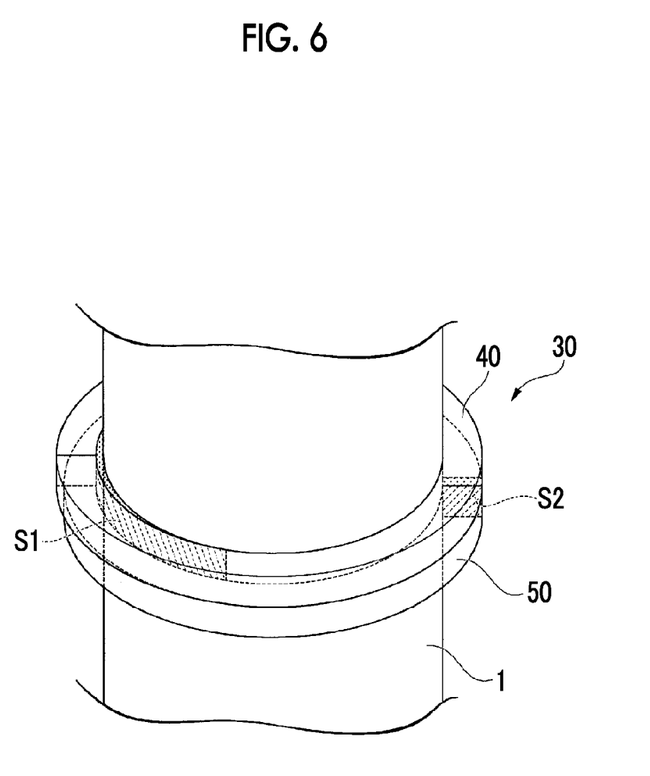
FIG. 6 is a perspective view of the leakage prevention seal of the pump for a nuclear reactor cooling material according to the first embodiment of the present invention that is reduced in diameter.

As a result, the first gap S1 as the gap between the first seal ring 40 and the rotating shaft 1 and the second gap S2 between the end portions of the second seal ring 50 are arranged at different circumferential positions as illustrated in FIG. 6.

Accordingly, the spaces on the upstream side and the downstream side that have the leakage prevention seal 30 as a boundary are divided from each other as illustrated in FIG.

4, and an upward flow (flow to the downstream side) of the high-temperature pressurized water is regulated. This will be described in detail below.

Firstly, the first seal ring 40 that has a closed loop shape is brought into close contact with the upper-side inner wall surface 4 of the annular groove 3 of the housing 2 in the entire circumferential direction. Then, the gap between the upper surface 42 of the first seal ring 40 and the upper-side inner wall surface 4 of the annular groove 3 of the housing 2 is removed and sealability is ensured.

In addition, the lower surface 43 of the first seal ring 40 is brought into close contact with the upper surface 52 of the second seal ring 50 in the entire circumferential direction. Then, sealability is ensured between the lower surface 43 of the first seal ring 40 and the upper surface 52 of the second seal ring 50.

In this state, the inner peripheral surface 51 of the second seal ring 50 is brought into close contact with the outer peripheral surface 1a of the rotating shaft 1 only at a part other than the second range θ2. Accordingly, in the second seal ring 50, high-temperature and high-pressure water leaks upward only in the second range θ2 where the second gap S2 is present. However, the first gap S1 is not present at the circumferential position in the first seal ring 40 where the second gap S2 is present. Accordingly, the high-temperature and high-pressure water leaking from the second gap S2 neither penetrates the first seal ring 40 nor leaks upward.

The high-temperature pressurized water does not reach the first gap S1 since the second seal ring 50 is in close contact with the outer peripheral surface 1a of the rotating shaft 1 at the circumferential position in the first seal ring 40 where the first gap S1 is present.

In this embodiment, the first range θ1 and the second range θ2 where the first gap S1 and the second gap S2 are formed have different positions in the circumferential direction as described above. Accordingly, the first gap S1 and the second gap S2 that may become leak paths for the high-temperature pressurized water are discontinuously formed. Accordingly, an upward flow of the high-temperature pressurized water penetrating the leakage seal can be prevented.

In this embodiment, the soft members 45 that are disposed at both of the ends of the ring main body 44 are brought into close contact with each other when the first seal ring 40 is reduced in diameter, and thus the first seal ring 40 can have a closed loop shape. Accordingly, the formation of a gap between the end portions of the first seal ring 40 can be prevented, and thus a flow of the high-temperature pressurized water between these end portions, otherwise used as the leak paths, can be avoided.

According to the configuration of this embodiment, the temperature at which the first thermo actuator 60A is driven is lower than the temperature at which the second thermo actuator 60B is driven. Accordingly, the first thermo actuator 60A is driven before the second thermo actuator 60B is driven in the event of reaching by the high-temperature pressurized water. Accordingly, the first seal ring 40 is reduced in diameter before the second seal ring 50 is reduced in diameter.

In a case where the second seal ring 50 is reduced in diameter before the first seal ring 40 is reduced in diameter, for example, an effect that the high-temperature pressurized water has on the second seal ring 50 becomes excessive and a reduction in the diameter of the second seal ring 50 that has a C shape is impeded. In this embodiment, however, the first seal ring 40 is reduced in diameter before the second seal ring 50 is reduced in diameter, and thus a differential pressure acting on the second seal ring 50 can be suppressed.

Figure 7A:
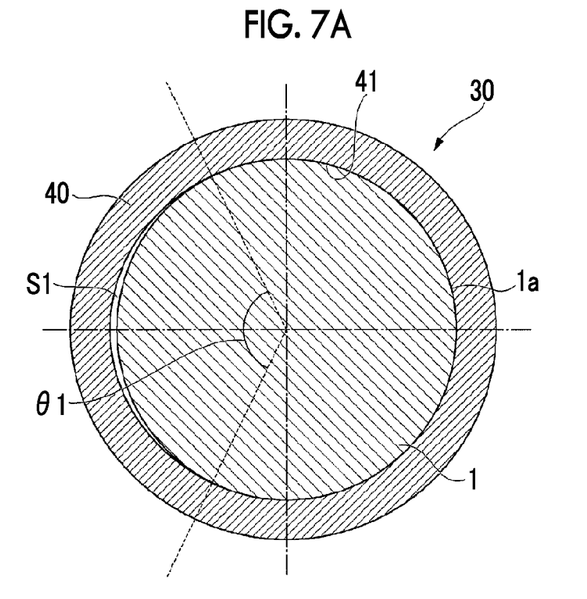
FIG. 7A is a schematic diagram in which a first seal of a leakage prevention seal of a pump for a nuclear reactor cooling material according to a modification example of the first embodiment of the present invention that is reduced in diameter is seen in an axial direction.
Figure 7B:
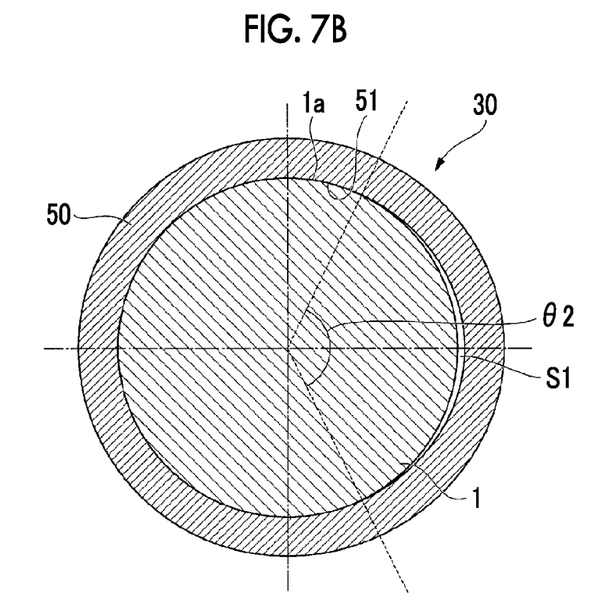
FIG. 7B is a schematic diagram in which a second seal of the leakage prevention seal of the pump for a nuclear reactor cooling material according to the modification example of the first embodiment of the present invention that is reduced in diameter is seen in an axial direction.

As illustrated in FIGS. 7A and 7B, for example, a modification example of the first embodiment may be configured for a crescent-shaped gap to be formed between the inner peripheral surface 41 of the first seal ring 40 and the outer peripheral surface 1a of the rotating shaft 1 and for another crescent-shaped gap to be formed between the inner peripheral surface 51 of the second seal ring 50 and the outer peripheral surface 1a of the rotating shaft 1.

The first gap S1 and the second gap S2 are formed in a case where both the circumferential lengths of the inner peripheral surface 41 of the first seal ring 40 and the inner peripheral surface 51 of the second seal ring 50 exceed the circumferential length of the outer peripheral surface 1a of the rotating shaft 1.

In this case, the first range θ1 and the second range θ2, which are regions where the first gap S1 and the second gap S2 formed during the reduction in diameter are formed, can have different circumferential positions when the arrangement locations of the end portions of the first seal ring 40 and the second seal ring 50 prior to the reduction in diameter have different circumferential positions. Accordingly, the first gap S1 and the second gap S2 are discontinuously formed as in the first embodiment, and thus the formation of a leak path for the high-temperature pressurized water can be avoided. Accordingly, an upward flow of the high-temperature pressurized water penetrating the leakage seal can be prevented.

In this modification example, both of the ends of the second seal ring 50 abut against each other, and thus the soft members 55 may be disposed at both of the ends. Then, the second seal ring can have a closed loop shape as is the case with the first seal ring 40.

Hereinafter, the leakage prevention seal 30 according to a second embodiment will be described with reference to FIG. 8. In this embodiment, like reference numerals will be used to refer to like elements in the first embodiment, and description thereof will be omitted.

The leakage prevention seal 30 according to the second embodiment differs from that according to the first embodiment in that the leakage prevention seal 30 according to the second embodiment is provided with a first gap positioning unit 70 in addition to the elements constituting the first embodiment.

The first gap positioning unit 70 determines the circumferential position of the first range θ1 where the first gap 31 is formed by applying a force in the radial direction to the first seal ring 40.

Figure 8:
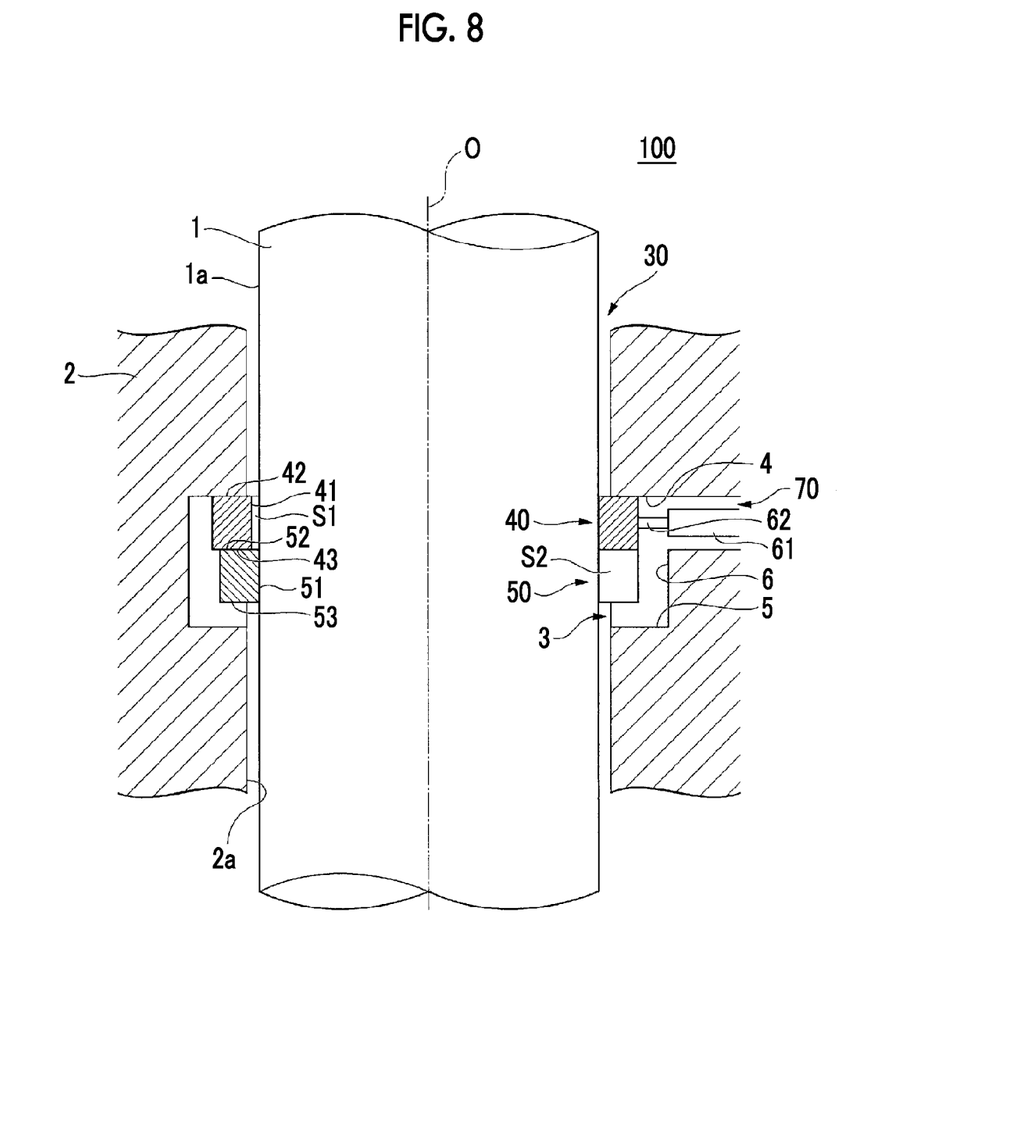
FIG. 8 is a longitudinal sectional view of a leakage prevention seal of a pump for a nuclear reactor cooling material according to a second embodiment of the present invention.

A configuration similar to the first thermo actuator 60A and the second thermo actuator 60B can be employed as the first gap positioning unit 70 as illustrated in FIG. 8. In other words, the first gap positioning unit 70 is provided with the cylinder 61 and the rod 62 and is configured for the rod 62 to protrude in the event of reaching by the high-temperature pressurized water.

The first gap positioning unit 70 is arranged on a radial outer side of the first seal ring 40. When the rod 62 protrudes, the tip of the rod 62 abuts against the first seal ring 40 from the radial outer side. Then, the first seal ring 40 is pressed toward the radial inner side, and the inner peripheral surface 41 of the first seal ring 40 is brought into close contact with the outer peripheral surface 1a of the rotating shaft 1 at the location at a circumferential position of the first seal ring 40 against which the rod 62 abuts. In this case, the inner peripheral surface 41 of the first seal ring 40 is separated from the outer peripheral surface 1a of the rotating shaft 1 on the side opposite to the location at the circumferential position of the first seal ring 40 against which the rod 62 abuts. Accordingly, the first gap S1 is formed between the inner peripheral surface 41 of the first seal ring 40 and the outer peripheral surface 1a of the rotating shaft 1.

In this embodiment, the first gap S1 that is formed between the inner peripheral surface 41 of the first seal ring 40 and the outer peripheral surface 1a of the rotating shaft 1, that is, the position of the first range θ1, can be positioned at a desired circumferential position by applying a force in the radial direction to the first seal ring 40 as described above.

When the first gap S1 is positioned in this manner, the first gap S1 and the second gap 52 can have different circumferential positions. Accordingly, the first gap S1 and the second gap S2 that become the leak paths for the high-temperature pressurized water are discontinuously formed, and an upward flow of the high-temperature pressurized water penetrating the leakage seal can be prevented.

In this embodiment, a configuration in which the first seal ring 40 is pressed from the radial outer side is adopted as the first gap positioning unit 70. However, a configuration in which the first seal ring 40 is pulled to the radial outer side may take the place. Even in this case, the first gap S1 can be positioned as in this embodiment.

In this embodiment, the first gap positioning unit 70 has a configuration similar to those of the first thermo actuator 60A and the second thermo actuator 60B. However, the present invention is not limited thereto, and another configuration may take the place insofar as a force is applied in the radial direction to the first seal ring 40 in the event of reaching by the high-temperature pressurized water.

In addition, a second gap positioning unit that applies a force in the radial direction to the second seal ring 50 may be disposed in a case where the crescent-shaped second gap 52 is also formed between the inner peripheral surface 51 of the second seal ring 50 and the outer peripheral surface 1a of the rotating shaft 1 as in the modification example of the first embodiment. Then, the second gap S2 can have any position, and thus the first gap S1 and the second gap 52 can have different positions.

Figure 9:
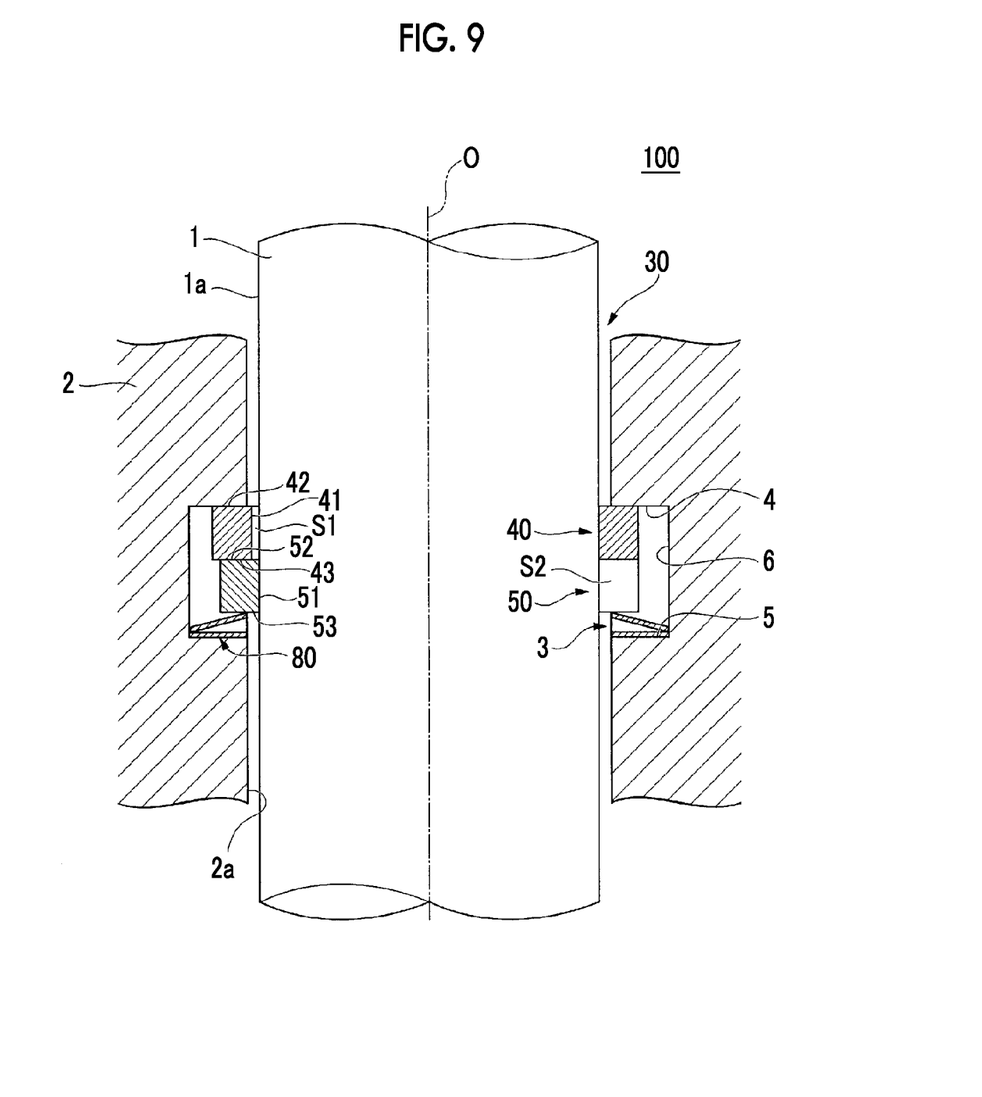
FIG. 9 is a longitudinal sectional view of a leakage prevention seal of a pump for a nuclear reactor cooling material according to a third embodiment of the present invention.

Hereinafter, the leakage prevention seal. 30 according to a third embodiment of the present invention will be described with reference to FIG. 9. In this embodiment, like reference numerals will be used to refer to like elements in the first embodiment, and description thereof will be omitted.

The leakage prevention seal 30 according to the third embodiment differs from that according to the first embodiment in that the leakage prevention seal 30 according to the third embodiment is provided with a pressing unit 80 in addition to the elements constituting the first embodiment.

The pressing unit 80 presses the second seal ring 50 toward the first seal ring 40 and toward the downstream side of the high-temperature pressurized water. In this embodiment, a disk spring is employed as the pressing unit 80. The disk spring is disposed in the circumferential direction between the lower-side inner wall surface 5 of the annular groove 3 and the lower surface 53 of the second seal ring 50 in the annular groove 3 of the housing 2. The disk spring applies a force to separate the lower-side inner wall surface 5 and the second seal ring 50 from each other by being arranged in a compressed state between the lower-side inner wall surface 5 and the second seal ring 50. Accordingly, a force from a lower die inner wall surface toward the lower surface 53 of the second seal ring 50, that is, an upward force, is applied to the lower surface 53 of the second seal ring 50.

As a result, the pressing force of the pressing unit 80 (elastic force of the disk spring) causes the upper surface 52 of the second seal ring 50 to be brought into close contact with the lower surface 43 of the first seal ring 40 in the circumferential direction and causes the upper surface 42 of the first seal ring 40 to be brought into close contact with the upper-side inner wall surface 4 of the annular groove 3 of the housing 2 in the circumferential direction.

Then, each of the sealability between the first seal ring 40 and the second seal ring 50 and the sealability between the first seal ring 40 and the upper-side inner wall surface 4 can be improved. Accordingly, leakage of the high-temperature pressurized water from the gap between the upper-side inner wall surface 4 and the first and second seal rings 40 and 50 can be prevented.

In addition, impediment to the reduction in the diameter of the second seal ring 50 can be inhibited even when a different pressure caused by the high-temperature pressurized water acts on the second seal ring 50.

Any configuration other than the above-described configuration can be employed as the pressing unit 80 insofar as the second seal ring 50 can be pressed toward the first seal ring 40, that is, upward.

For example, the pressing unit 80 is not limited to the disk spring, and another elastic member such as a coil spring may be employed as the pressing unit 80.

In addition, a cylinder rod mechanism that has the cylinder 61 and the rod 62 and is similar to the first thermo actuator 60A and the second thermo actuator 60B may be employed as the pressing unit 80. In a case where the cylinder rod mechanism is employed, the rod 62 that protrudes from the cylinder 61 presses the second seal ring 50 upward, that is, toward the first seal ring 40.

Examples of other possible configurations may include one in which the second seal ring 50 is pressed upward by the rod 62 protruding toward the radial inner side and a wedge-type member which is disposed at the tip of the rod 62 sliding upward along an inclined surface which is formed on the lower-side inner wall surface 5 of the housing 2.

As another example, a configuration in which the second seal ring 50 presses the first seal ring 40 upward by using a force that is applied to the second seal ring 50 from the second thermo actuator 60B and the second gap positioning unit may be employed as the pressing unit 80. In other words, a guiding surface that guides the second seal ring 50 upward when a force is applied to the second seal ring 50 from the second thermo actuator 60B and the second gap positioning unit may be employed as the pressing unit 80.

The embodiments of the present invention have been described above. The present invention is not limited thereto, and can be appropriately changed without departing from the technical idea of the present invention.

The first thermo actuator 60A and the second thermo actuator 60B constitute the heat-driven section 60 in the embodiments described above. However, for example, the first seal ring 40 and the second seal ring 50 themselves may be configured to be bimetallic, formed by laminating two types of metals that have different linear expansion coefficients. In this case, the first seal ring 40 and the second seal ring 50 are reduced in diameter, in the event of reaching by the high-temperature pressurized water, because of the difference in expansion between the two metals that form the bimetal heat-driven section 60. Then, the prevention of the leakage of the high-temperature pressurized water by the first seal ring 40 and the second seal ring 50 can be achieved as in the embodiments.

In addition, any other configuration may be employed as the heat-driven section 60 insofar as the first seal ring 40 and the second seal ring 50 can be reduced in diameter in the event of reaching by the high-temperature pressurized water.

INDUSTRIAL APPLICABILITY

According to the leakage prevention seal and the pump for a nuclear reactor cooling material described above, the first gap and the second gap becoming the leak paths for the high-temperature pressurized water are discontinuously formed, and thus the flow of the high-temperature and high-pressure pressurized water can be regulated in the event of an abnormality.

REFERENCE SIGNS LIST

1 Rotating shaft
1a Outer peripheral surface
2 Housing
2a Inner peripheral surface
3 Annular groove
4 Upper-side inner wall surface (abutting surface)
5 Lower-side inner wall surface
6 Bottom wall surface
10 Shaft seal
10A First shaft seal
11A First runner
12A First ring
10B Second shaft seal.
11B Second runner
12B Second ring
10C Third shaft seal
11C Third runner
12C Third ring
15 Filling material pump
16 Volume control tank
17 Shielding valve
18 Flow meter
19 Purge water head tank
20 Flow meter
21 Pure water make-up tank
22 Pure water pump
23 Supplementary feed valve
24 Level control device
25 Flow meter
26 Stand pipe
27 Drain tank
30 Leakage prevention seal.
40 First seal ring
41 Inner peripheral surface
42 Upper surface
43 Lower surface
44 Ring main body
45 Soft member
46 Protruding portion
50 Second seal ring
51 Inner peripheral surface
52 Upper surface
53 Lower surface
54 Ring main body
55 Soft member
56 Protruding portion
60 Heat-driven section
60A First thermo actuator
60B Second thermo actuator
61 Cylinder
62 Rod
70 First gap positioning unit
80 Pressing unit
100 Pump for nuclear reactor cooling material.
O Axis
S1 First gap
S2 Second gap
$\theta 1$ First range
$\theta 2$ Second range

The invention claimed is:

1. A leakage prevention seal sealing a space between a rotating shaft rotating about an axis and a housing surrounding the rotating shaft from a radial outer side so as to regulate a flow of high-temperature pressurized water in the space from the upstream side to the downstream side in an axial direction, the leakage prevention seal comprising:

a first seal ring which surrounds the rotating shaft and which contacts with an upstream side surface of the housing along a circumferential direction in the rotating shaft;

a second seal ring, which, on the upstream side of the first seal ring, surrounds the rotating shaft and which contacts with an upstream surface of the first seal ring along the circumferential direction in the rotating shaft; and a heat-driven section which, when high-temperature pressurized water reaches the heat-driven section, reduces the diameter of both the first seal ring and the second seal ring and causes the inner peripheral surfaces of both the first seal ring and the second seal ring to be in contact with the rotating shaft, wherein the first seal ring has a closed loop shape to form a first gap extending over a first range in a circumferential direction between the rotating shaft and the first seal ring during the reduction in diameter, wherein the second seal ring forms a second gap, which allows the high-temperature pressurized water to leak to the downstream side, over a second range in the circumferential direction during the reduction in diameter, and wherein the circumferential positions of both the first range and the second range are different.

2. The leakage prevention seal according to claim 1, further comprising a first gap positioning unit determining the circumferential position of the first range where the first gap is formed by applying a force in a radial direction to the first seal ring.

3. The leakage prevention seal according to claim 2, further comprising a pressing unit pressing the second seal ring toward the first seal ring.

4. The leakage prevention seal according to claim 3, wherein the first seal ring includes:

a ring main body extending in the circumferential direction of the rotating shaft; and a pair of soft members disposed at both respective ends of the ring main body, formed of a material softer than the material of the ring main body, and brought into contact with each other during the reduction in diameter.

5. The leakage prevention seal according to claim 4, wherein the heat-driven section reduces the diameter of the first seal ring at a first temperature and reduces the diameter of the second seal ring at a second temperature, and wherein the first temperature is lower than the second temperature.

6. The leakage prevention seal according to claim 5,
wherein the second seal ring has a closed loop shape when reduced in diameter, and
wherein the second gap extends over the second range between the second seal ring and the rotating shaft.

7. The leakage prevention seal according to claim 6, further comprising a second gap positioning unit determining the circumferential position of the second range where the second gap is formed by applying a force in the radial direction to the second seal ring.

8. The leakage prevention seal according to claim 5,
wherein the second seal ring has a C shape for both circumferential ends to face each other in the circumferential direction during the reduction in diameter, and
wherein the second gap is formed between both of the ends of the second seal ring.

9. A pump for a nuclear reactor cooling material comprising:
a rotating shaft rotating about an axis;
a housing surrounding the rotating shaft from a radial outer side; and
a leakage prevention seal according to claim 8 sealing a space between the rotating shaft and the housing so as to regulate a flow of high-temperature pressurized water in the space from the upstream side to the downstream side in the axial direction.

10. The pump for a nuclear reactor cooling material according to claim 9,
wherein an annular groove recessed to the radial outer side and extending in a circumferential direction is formed in an inner peripheral surface of the housing,
wherein the first seal ring and the second seal ring are arranged to be accommodated in the annular groove, and
wherein the surface of the annular groove facing the upstream side is an abutting surface.

* * * * *